GATING CIRCUIT ARRANGEMENT

Filed May 25, 1966

INVENTOR.
GEOFFREY N. HUNTER
BY
Frank R. Trifari
AGENT

United States Patent Office 3,488,520

Patented Jan. 6, 1970

3,488,520

GATING CIRCUIT ARRANGEMENT

Geoffrey Neil Hunter, Horley, Surrey, England, assignor, by mesne assignments, to U.S. Philips Corporation, New York, N.Y., a corporation of Delaware Filed May 25, 1966, Ser. No. 552,781

Claims priority, application Great Britain, May 25, 1965, 22,117/65

Int. Cl. H03k *17/60*

U.S. Cl. 307—251 6 Claims

ABSTRACT OF THE DISCLOSURE

A gating circuit employing two field effect transistors connected between a signal input and ground, with an output taken between them, a biasing circuit biasing one transistor conductive and a second non-conductive, and a bipolar pulse generator, D.C. insulated from the biasing circuit, for supplying pulses for alternatively changing the conductive states of each transistor.

This invention relates to gating circuit arrangements and more particularly to gating circuit arrangements for use in computer for attenuating unwanted switching transients occurring on the sense line of an information storage matrix which is coupled to a sense amplifier.

In some computers, in particular computers which have a storage matrix consisting of ferrite cores, the signal strength of information obtained from the matrix is very low compared with the switching transients occurring on the sense readout line which appear as noise pulses. The information signal has to be amplified in a sense amplifier before it can be used. The sense amplifier therefore generally has a large gain. However, when the large switching transient pulses occur the sense amplifier may be overdriven and paralyzed for a short while after the occurence of the pulse. If the information signal occurs shortly after the switching transient pulse it can be lost because of the paralyzed sense amplifier.

It is, therefore, an object of the present invention to provide a gating circuit arrangement for attenuating the unwanted switching transients without seriously attenuating the information signal.

According to the invention, there is provided a gating circuit arrangement, for attenuating unwanted switching transients occurring on a sense line of an information storage matrix comprising signal input means, signal output means, a potential reference point, a first insulated gate field effect transistor connected between said signal input means and said signal output means, a second insulated gate field effect transistor connected between said signal output means and said reference point, biasing means for normally biasing the said first and second transistors to a non-conductive condition and a conductive condition respectively and means for conveying switching pulses to the first and second transistors which render them conductive and non-conductive respectively.

The insulated gate field effect transistors, which may be MOST's of the same conductivity type, and the switching pulses applied to the first transistor may be of opposite polarity to the switching pulses applied to the second transistor. The oppositely poled switching pulses may be arranged to be produced by a pulse generating means in response to a gating pulse.

The pulse generating means may include a bipolar transistor having emitter, base and collector electrodes, said base electrode being connected to further biasing means for biasing said transistor in a first state, said gating pulse causing said transistor to undergo a change of state, and causing said pair of oppositely poled pulses to be developed at the collector and emitter electrodes respectively.

The invention also provides an information gating circuit arrangement comprising information input means, information output means, a potential reference point, a first insulated-gate field effect transistor having gate source, substrate and drain electrodes, a second insulated-gate field effect transistor having gate, source, substrate and drain electrodes, means connecting said first field effect transistor source electrode to said information input means, means connecting said first field effect transistor drain electrode to said second field effect transistor drain electrode and to said information output means, means connecting said second field effect transistor source electrode to said point of reference potential, means connecting said first field effect transistor substrate electrode to a separate biasing source of potential, means connecting said second field effect transistor substrate electrode to said second field effect transistor source electrode, first biasing means connected to the gate electrode of said first field effect transistor for biasing said first transistor to a normally non-conductive condition, second biasing means connected to the gate electrode of said second field effect transistor for biasing said second transistor to a normally conductive condition, a gating pulse terminal, a pulse generating means having an input connected to said gating pulse terminal, said pulse generating means supplying a pair of oppositely poled pulses in response to a gating pulse applied to said gating pulse terminal, means conveying one of said pair of oppositely poled pulses to the gate electrode of said first field effect transistor for rendering said first transistor conductive, and means conveying the other of said pair of oppositely poled pulses to the gate electrode of said second field effect transistor for rendering said second transistor non-conductive.

An embodiment of the invention will now be described, by way of example, with reference to the accompanying diagrammatic drawing in which.

Figure 1:
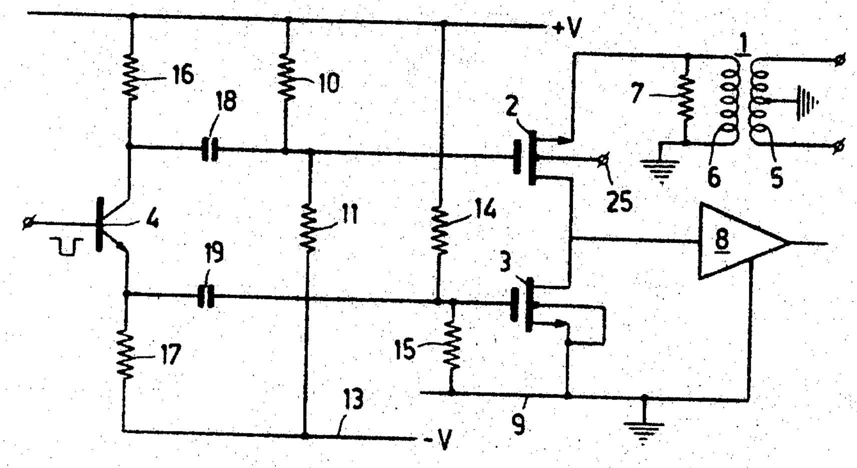
FIGURE 1 shows a circuit of the gating arrangement.

Referring now to FIGURE 1 of the drawing, the gate circuit arrangement comprises basically a transformer 1, a pair of insulated-gate field effect transistors 2 and 3 and a pulse generating circuit including a transistor 4. The transistors 2 and 3 are metal oxide semi-conductor transistors (MOST) each having a gate, a source, a drain and a substrate electrode and the transistor 4 is NPN transistor having an emitter, a collector and a base electrode. The transformer 1 consists of a centre tapped primary winding 5, the centre tap of which is earthed for common mode signal rejection, and a secondary winding 6. A matching resistor 7 is connected across the secondary winding 6. One of the terminals of the secondary winding 6 of the transformer 1 is earthed and the other terminal is connected directly to the source electrode of the transistor 2. The drain electrode of the transistor 2 is directly connected to a sense amplifier 8 and the substrate electrode 25 is connected to a source of substantially constant potential (not shown). The drain electrode of transistor 3 is connected directly to the drain electrode of the transistor 2 and to the amplifier 8, and the source electrode of transistor 3 is connected directly to a supply line 9 which is earthed. The biasing of the gate electrode of the transistor 2 is obtained from the junction between resistors 10 and 11 which are connected in the form of a potential divider between D.C. supply lines 12 and 13 and the gate bias for the transistor 3 is obtained from the potential divider formed by resistors 14 and 15 connected between supply line 12 and supply line 9.

The pulse generating circuit comprises the NPN transistor 4 having its collector electrode connected by way of a resistor 16 to the supply line 12, and its emitter electrode connected by way of a resistor 17 to the supply line 13. The collector electrode of the transistor 4 is coupled to the gate electrode of the transistor 2 by way of a capacitor 18. The emitter electrode is similarly coupled to the gate electrode of the transistor 3 by way of a capacitor 19. The transistor 4 was selected as an NPN transistor rather than a PNP transistor to take advantage of the faster switching of NPN devices. However this means that the transistor 4 is generally in the conductive condition and is switched non-conductive when the information signal is to be applied to the amplifier 8.

In a particular embodiment of the circuit components had the following values:

Transistors 2 and 3 metal, oxide, semiconductor transistor (MOST) type 95BFY as sold by Mullard Ltd.

Transistors 4 type BSY39 as sold by Mullard Ltd.

| | | |
|---|---|---|
| Resistor **7** | ohms | 120 |
| Resistor **10** | do | 10K |
| Resistor **11** | do | 10K |
| Resistor **14** | do | 10K |
| Resistor **15** | do | 22K |
| Resistor **16** | do | 1K |
| Resistor **17** | do | 1K |
| Capacitor **18** | pf | 25K |
| Capacitor **19** | pf | 25K |

A potential of +12 volts applied to a supply line 12 and a potential of −12 volts applied to a supply line 13.

Figure 2:
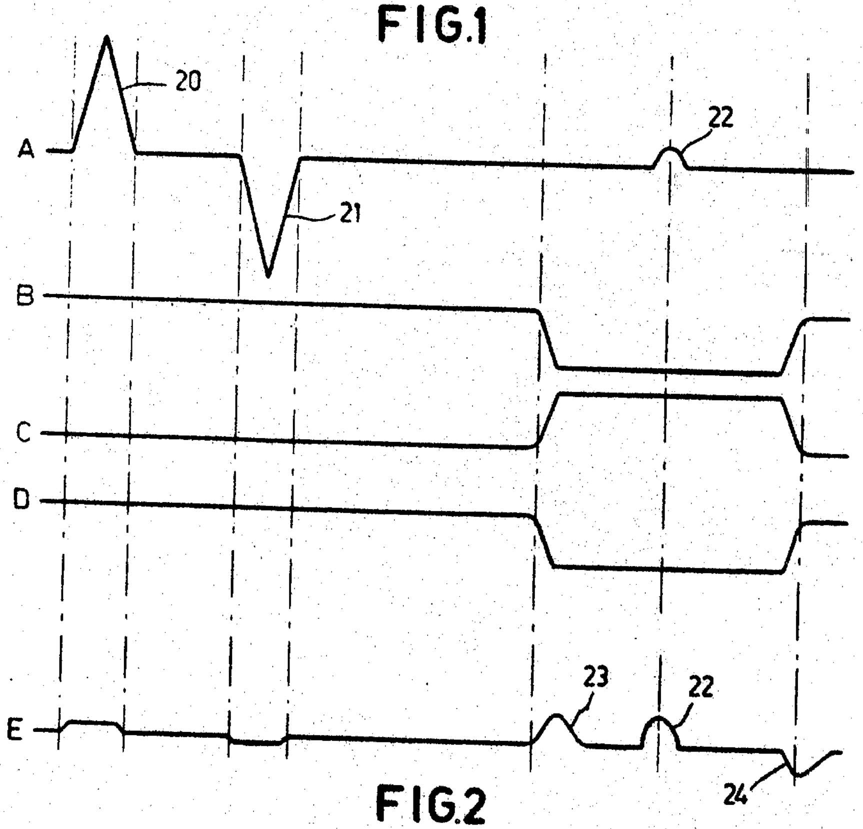
FIGURE 2 shows the typical pulse waveform occurring at various points in the circuit of FIGURE 1.

Referring now also to FIGURE 2, the graph A shows the type of waveform occurring at the tarnsformer 1. The large switching transients 20 and 21 occur shortly before the information pulse 22. The operation of the gate circuit will now be explained to illustrate how the switching transients 20 and 21 are attenuated by about 1000:1 whereas the information pulse 22 is only attenuated by $\frac{1}{10}$.

The transistor 2 is normally held non-conductive by the biasing provided by the resistors 10 and 11 and so forms a high impedance. The transistor 3, however, is normally held in the conductive state by the biasing provided by the resistors 14 and 15 and so forms a low impedance path to earth for any signal or noise on the signal path between the transistor 2 and the sense amplifier 8. With the transistors 2 and 3 in this condition, any signals from the input transformer 1 are attenuated by the transistor 2 and return to earch by way of the transistor 3 which has a considerably lower impedance in the conductive state than the return path to earth by way of the sense amplifier 8.

When it is required to amplify the information signal pulse 22, the transistor 2 is switched to the conductive condition and the transistor 3 to the non-conductive condition. This is achieved by applying a pulse having a waveform shown in graph B of FIGURE 2 to the base electrode of the transistor 4 so causing the transistor 4 to supply a pulse, having a waveform shown in graph C of FIGURE 2 to the gate electrode of the transistor 2 and a similar but inverted pulse as shown in graph D to the gate electrode of the transistor 3. In this case the important characteristics of the insulated gate field effect transistors are their inter-electrode capacitances, the effects of which, when the transistors are operating in the circuit, should cancel out. Ideally the waveform of the pulses shown in graphs C and D are identical so that if the inter-electrode capacitances, gate to drain, of the transistors 2 and 3 are equal, no switching transients are applied to the sense amplifier. However, if transistor 4 is a PNP device, the waveform shown in graphs C and D of FIGURE 2 lags slightly behind the waveform B, and the slope of the leading edge of waveform D is not so steep as the slope of the leading edge of waveform C due to the form of the pulse generating circuit. The departure from the ideal can be used to advantage by causing the transistor 2 to be switched to the conductive condition while the transistor 3 is momentarily still in the conductive condition and so the switching transient produced by the transistor 2 is not applied to the sense amplifier 8 but is returned to earth by way of the transistor 3. Alternatively, if it is desired to maintain the transistor 4 as an NPN device so as to obtain the advantages of fast switching, then to achieve the same effect for the leading and trailing edges the capacitors 18 and 19 should be cross connected so that the capacitor 18 is coupled to its emitter electrode and the capacitor 19 is coupled to the collector electrode of the NPN transistor 4. There will, however, be a small switching transient and graph E of FIGURE 2 shows the waveform applied to the sense amplifier 8. From this graph E, it will be seen that these switching transients occur on the signal path due to switching the transistors 2 and 3. However, the amplitude of these transients are comparable to the amplitude of the information signal and so do not paralyze the sense amplifier. The shape of the waveform of the switching transient is not important to the operation of the circuit, but the transient is arranged to have decayed substantially to zero before the occurrence of the information signal pulse. The selection of the information signal is unimpaired and can be achieved as is known by synchronously sensing the output from the amplifier 8.

As the unwanted signals occurring on the signal path may be positive or negative as shown by the pulses 20 and 21, the substrate electrode 25 of the transistor 2 should be connected to a source of potential more negative than the maximum potential which is likely to be applied to the source electrode. The substrate electrode of the transistor 3 is strapped to the source electrode to prevent the substrate going more positive than the source. In the particular embodiment quoted above the substrate electrode of the transistor 2 was connected to the supply line 13. The timing of the pulse applied to the base electrode of the transistor 4 must be such that the unwanted signals are attenuated and the information signal occurs approximately midway during the duration of the switching pulses to the transistors 2 and 3. The switching transients caused by the switching of the transistors 2 and 3 and shown as pulses 23 and 24 on graph E of FIGURE 2 were of approximately 80 nanoseconds duration and the period over which the transistor 2 was fully conductive was approximately 300 nanoseconds.

When the information signal has been sensed it is preferable to arrange for the transistor 3 to be switched to the conductive condition as the transistor 2 is switched by the trailing edge of the pulse waveform C to the non-conductive condition. If the two switching pulses can not be perfectly balanced then it may be of some advantage to arrange the trailing edges to be noncoincident. But this has to be a compromise, as the further apart the trailing edges become the smaller is the cancelling out effect of one or the other.

When the first and second transistors are formed on a common substrate, the D.C. biasing of the transistor 3 is adjusted and the common substrate electrode is connected to a source of potential more negative than any potential applied, during operation to the input electrode of the first transistor.

It will be appreciated that the MOS transisotrs 2 and 3 may be of either conductivity type provided the polarity of the switching pulses from the generating circuit are suitably altered.

If the transistors 2 and 3 are complementary transistors, that is to say, one having a P type and the other an N type channel, then both transistors could be driven by the same pulse form. It is hoped that with recent developments in four terminal insulated-gate field effect transistor devices that the inter-electrode capacitance can be made such that matching complementary four terminal transistors can be employed in the gating circuit arrangements the subject of this invention.

What I claim is:

1. A signal gating circuit comprising signal input means, signal output means, a potential reference point, a first field effect transistor connected between said signal input means and said signal output means, said signal input means including a transformer having a primary and secondary winding, said primary winding adapted to receive a pair of bipolar signals and having a center tap connected to said reference point for common mode rejection, said secondary winding having a matching resistance connected thereacross and being connected to said first transistor, a second field effect transistor connected between said signal output means and said reference point, first means biasing said first transistor to a normally non-conductive condition, second means biasing said second transistor to a normally conductive condition, a gating pulse terminal, pulse generating means having an input connected to said gating pulse terminal, said pulse generating means supplying a pair of oppositely poled pulses in response to a gating pulse applied to said gating pulse terminal, means conveying one of said pair of oppositely poled pulses to said first transistor for rendering said first transistor conductive, and means for conveying the other of said pair of oppositely poled pulses to said second transistor for rendering said second transistor non-conductive.

2. An information gating circuit comprising information input means, information output means, a potential reference point, a first field effect transistor having gate source, substrate and drain electrodes, a second field effect transistor having gate, source, substrate and drain electrodes, means connecting said first field effect transistor source electrode to said information input means, means connecting said first field effect transistor drain electrode to said second field effect transistor drain electrode and to said information output means, means connecting said second field effect transistor source electrode to said point of reference potential, means connecting said first field effect transistor substrate electrode to a separate biasing source of potential more negative than the maximum potential which is likely to be applied to the source electrode of said first field effect transistor, means connecting said second field effect transistor substrate electrode to said second field effect transistor source electrode, first biasing means connected to the gate electrode of said first field effect transistor for biasing said first transistor to a normally non-conductive condition, second biasing means connected to the gate electrode of said second field effect transistor for biasing said second transistor to a normally conductive condition, a gating pulse terminal, a pulse generating means having an input connected to said gating pulse terminal, said pulse generating means supplying a pair of oppositely poled pulses in response to a gating pulse applied to said gating pulse terminal, first capacitive coupling means conveying one of said pair of oppositely poled pulses to the gate electrode of said first field effect transistor for rendering said first transistor conductive, and second capacitive coupling means conveying the other of said pair of oppositely poled pulses to the gate electrode of said second field effect transistor for rendering said second transistor non-conductive.

3. The combination of claim 6 wherein said one of said pair of oppositely poled pulses has a steeper leading edge characteristic than said other of said pair of oppositely poled pulses, whereby a brief period of conductivity for both of said field effect transistors exists simultaneously to substantially eliminate switching transients.

4. The combination of claim 2 wherein said signal input means includes a transformer having a primary and secondary winding, said primary winding adapted to receive a pair of bipolar signals and having a center tap connected to said reference point for common mode rejection, said secondary winding being connected to said first transistor.

5. The combination of claim 2 wherein said pulse generating means comprises a conventional transistor having emitter, base and collector electrodes, said base electrode connected to said gating pulse terminal biasing means for biasing said transistor in a first state, said gating pulse causing said conventional transistor to undergo a change of state, and causing said pair of oppositely poled pulses to be developed at the collector and emitter electrodes respectively, first capacitive means coupling one of said pulses to said first field effect transistor, and second capacitive means coupling the other of said pulses to said second field effect transistor.

6. The combination of claim 2 wherein said signal output means comprises a signal amplifier.

References Cited

UNITED STATES PATENTS

| | | | |
|---|---|---|---|
| 3,031,588 | 4/1962 | Hilsenrath | 307—293 |
| 3,229,218 | 1/1966 | Sickles et al. | 307—251 |
| 3,286,153 | 1/1966 | Fumiyuy | 307—254 |

OTHER REFERENCES

Dept. of the Army Technical Manual TM 11–690 Basic Theory & Application of Transistors March 1959, page 125.

JOHN S. HEYMAN, Primary Examiner

B. P. DAVIS, Assistant Examiner

U.S. Cl. X.R.

307—239, 304